(12) United States Patent
Beckmann et al.

(10) Patent No.: US 9,078,221 B2
(45) Date of Patent: Jul. 7, 2015

(54) METHODS, DEVICES AND SOFTWARE PROGRAMS FOR ADAPTING UPLINK SIGNALING DURING MULTICASTING

(75) Inventors: Mark Beckmann, Braunschweig (DE); Hyung-Nam Choi, Hamburg (DE); Michael Eckert, Braunschweig (DE); Thomas Gottschalk, Berlin (DE); Martin Hans, Hildesheim (DE); Norbert Schwagmann, Braunschweig (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 2557 days.

(21) Appl. No.: 10/486,295

(22) PCT Filed: Jul. 9, 2002

(86) PCT No.: PCT/DE02/02512
§ 371 (c)(1),
(2), (4) Date: Feb. 9, 2004

(87) PCT Pub. No.: WO03/017523
PCT Pub. Date: Feb. 27, 2003

(65) Prior Publication Data
US 2004/0209638 A1    Oct. 21, 2004

(30) Foreign Application Priority Data

Aug. 7, 2001  (DE) .................................. 101 38 767
Nov. 6, 2001  (DE) .................................. 101 54 428

(51) Int. Cl.
G06F 15/177    (2006.01)
H04W 52/32    (2009.01)
H04W 52/14    (2009.01)

(52) U.S. Cl.
CPC .......... *H04W 52/322* (2013.01); *H04W 52/146* (2013.01); *H04W 52/143* (2013.01); *H04W 52/327* (2013.01)

(58) Field of Classification Search
USPC ........................................................ 709/220
See application file for complete search history.

(56) References Cited

U.S. PATENT DOCUMENTS 6,490,461 B1 * 12/2002 Muller ........................... 455/522
6,590,461 B2 *  7/2003 Kawano ......................... 331/74

(Continued)

FOREIGN PATENT DOCUMENTS

EP    1 063 782      12/2000
JP    2000307513    11/2000 ............. H04B 1/707

(Continued)

OTHER PUBLICATIONS

Carl Gustav Lof—Power Control in Cellular Radio Systems with Multicast Traffic, Radio Communications Systems, Lab., pp. 910914.

*Primary Examiner* — Richard G Keehn
(74) *Attorney, Agent, or Firm* — Slayden Grubert Beard PLLC

(57) ABSTRACT

In a method for adapting uplink signaling during multicasting, the user devices of a multicast group receive a multicast message from a network control unit via a radio channel (PMcCH) in a downlink connection. The radio channel is adapted with respect to its power by transmitting information in an uplink connection via a corresponding radio channel (UL-DPCCH). The radio channel (UL-DPCCH) is power-controlled via at least one associated common radio channel (DL-PMcCH) that is associated with one or more of the user devices by transmitting corresponding information in the downlink direction from the network control unit to the user devices. The information is then processed by the receiving user devices to adapt the power of the respective associated radio channels (UL-DPCCH) in the uplink direction.

19 Claims, 3 Drawing Sheets

(56) References Cited

U.S. PATENT DOCUMENTS

| | | | |
|---|---|---|---|
| 6,594,499 B1 * | 7/2003 | Andersson et al. | 455/522 |
| 6,647,005 B1 * | 11/2003 | Cao et al. | 370/342 |
| 6,735,180 B1 * | 5/2004 | Malkamaki et al. | 370/282 |
| 6,772,112 B1 * | 8/2004 | Ejzak | 704/201 |
| 6,996,083 B1 * | 2/2006 | Balachandran et al. | 370/337 |
| 7,006,477 B1 * | 2/2006 | Balachandran et al. | 370/337 |
| 7,113,496 B2 * | 9/2006 | Koo et al. | 370/335 |
| 7,349,425 B2 * | 3/2008 | Leung et al. | 370/465 |
| 2001/0038619 A1 * | 11/2001 | Baker et al. | 370/335 |
| 2001/0040883 A1 * | 11/2001 | Chang et al. | 370/344 |
| 2001/0046220 A1 * | 11/2001 | Koo et al. | 370/335 |
| 2002/0071480 A1 * | 6/2002 | Marjelund et al. | 375/141 |
| 2002/0077141 A1 * | 6/2002 | Hwang et al. | 455/522 |
| 2002/0115460 A1 * | 8/2002 | Rune et al. | 455/522 |
| 2002/0119797 A1 * | 8/2002 | Woodhead et al. | 455/522 |
| 2002/0150092 A1 * | 10/2002 | Bontempi et al. | 370/389 |
| 2002/0168984 A1 * | 11/2002 | Wallentin | 455/452 |
| 2003/0081586 A1 * | 5/2003 | Malladi et al. | 370/345 |
| 2003/0099209 A1 * | 5/2003 | Laakso et al. | 370/311 |
| 2003/0103476 A1 * | 6/2003 | Choi et al. | 370/329 |
| 2004/0141548 A1 * | 7/2004 | Shattil | 375/146 |
| 2005/0152398 A1 * | 7/2005 | Shin | 370/469 |
| 2008/0090549 A1 * | 4/2008 | Vialen et al. | 455/405 |

FOREIGN PATENT DOCUMENTS

| | | | |
|---|---|---|---|
| JP | 2001007759 | 1/2001 | H04B 7/26 |
| WO | WO0004728 | 1/2000 | |

* cited by examiner

METHODS, DEVICES AND SOFTWARE PROGRAMS FOR ADAPTING UPLINK SIGNALING DURING MULTICASTING

CROSS-REFERENCE TO RELATED APPLICATIONS

This application is a U.S. national stage application of International Application No. PCT/DE02/02512 filed Jul. 9, 2002, which designates the United States of America, and claims priority to German Application No. 101 38 767.9 filed Aug. 7, 2001 and German Application No. 101 54 428.6 filed Nov. 6, 2001, the contents of which are hereby incorporated by reference in their entirety.

TECHNICAL FIELD

The invention relates to methods, devices and software programs for adapting uplink signaling during multicasting.

BACKGROUND

With many of the services and applications provided in modern mobile radio systems, messages are intended to be transmitted not just to one, but to two and more mobile radio subscribers. Examples of such services and applications are newsgroups, videoconferences, video-on-demand, distributed applications, etc. During the transmission of messages to the different subscribers it is possible to send a copy of the data separately to each recipient. This technique, though simple to implement, is however not suitable for large groups. As the same message is transmitted over N (where N=number of recipients of the message) individual connections (unicast connections) and is also sent a number of times over common connection paths, this method requires a very high bandwidth.

In this case multicast transmission offers a better alternative. With this method, the various subscribers to whom the same message is to be transmitted are combined to form a group (multicast group) to which an address (multicast address) is assigned (point-to-multipoint transmission). The data to be transmitted is then sent only once to this multicast address. In the ideal case the multicast message is sent only once from the sender to the recipients over common connection paths. In this process the sender does not need to know the location of the recipients or how many recipients are covered by the multicast address.

No multicast transmission has been specified to date in UMTS (Universal Mobile Telecommunication System). In the UMTS mobile radio system the transmission of information to a user is effected by reservation of a physical resource. In the mobile radio service a distinction is made between two transmission directions for the transfer of data, irrespective of which type of data is involved. The data transmission from the typically stationary base station (designation in GSM-Global System for Mobile Communications) or NodeB (designation in UMTS) to the mobile terminals is generally referred to as transmission in the downlink direction DL, whereas the data transmission in the opposite direction, from a terminal to the base station, is known as transmission in the uplink direction UL. In UMTS two modes are provided for transmission over the air interface: In FDD mode the transmission in uplink and downlink directions takes place at different frequencies, whereas in TDD mode only one carrier frequency is used. Time slots are assigned to separate the uplink and downlink directions. In both modes the subscribers are separated by superposition of orthogonal codes (channelization codes) onto the information data. This multiple access method is known as the CDMA method. According to the current specifications (among other sources see TS 25.211 V4.0.0: Physical channels and mapping of transport channels onto physical channels, 3GPP-TSG-RAN, 2001-3 and TS 25.212 V4.0.0: Multiplexing and channel coding, 3GPP-TSG-RAN, 2001-3) of the UMTS-FDD mode, a physical channel, i.e. a radio channel, is defined in the downlink direction by carrier frequency, scrambling code, channelization code, and a start and stop time. The scrambling codes are used to scramble the already spread data. This is intended among other things to minimize the interferences in neighboring cells.

In UMTS there are two types of radio channels for transmitting information, called dedicated channels and common channels. With the dedicated channels a physical resource is reserved only for the transmission of information intended for a specific subscriber device only (user equipment). With the common channels information intended for all subscribers can be transmitted (e.g. the broadcast channel BCH) or for a specific subscriber only. In the latter case an indication of which subscriber the information is intended for must also be transmitted on the common channel.

Also part of the prior art is the SIR-based (Signal-to-Interference Ratio) closed-loop power control, which will be described briefly below (see also TS 25.214 V4.0.0: Physical layer procedures, 3GPP-TSG-RAN, 1 2001-3). The mobile radio device makes an estimate of the SIR for the dedicated channels which it receives. This value represents a quality criterion for the received signal. By comparison with a predefined value $SIR_{target}$, a TPC (Transmission Power Control) command is generated and the result sent to the base station over an uplink channel. The value of $SIR_{target}$ is here predefined individually for each mobile station by the network such that adequate quality is guaranteed for the respective connection. The TPC commands are pure 1-bit items of information and constitute solely the information concerning whether the measured SIR is above or below the predefined value $SIR_{target}$. For this reason the TPC commands can also be equated with the commands "UP" (SIR below $SIR_{target}$) and "DOWN" (SIR above $SIR_{target}$). The command "UP" means that the reception quality is inadequate and therefore an increase in transmission power is necessary at the transmitter. The converse applies to the "DOWN" command.

Group or multicast messages are usually sent via dedicated channels from the base stations or NodeBs disposed in the radio cells to the subscriber devices (mobile radio stations or mobile stations in GSM, user equipments UEs in UMTS; an appended "s" is used to form the plural) of the multicast group. In order to adjust the power of this message transmission or to transmit at sufficient and not too high power, an associated uplink channel is available per subscriber device, which channel informs the base station by means of TPC bits (transmission power control bits) that the transmission power is too high or too low for the respective subscriber device. The uplink-dedicated channel UL-DCH which transmits the TPC bits is usefully also controlled in terms of power so that the interferences in the mobile radio cell due to the UL transmission by a plurality of subscriber devices are kept as low as possible. As is known, this control is effected in turn by a dedicated DL channel associated with the UL channel. In UMTS an associated DL channel is assigned in this case to each subscriber device. This disadvantageously results in system resources being occupied with regard to spreading codes.

SUMMARY

A means of power adjustment for the transmission of multicast or group messages can be made available which saves on system resources.

According to an embodiment, in a method for use with network control units for power adjustment during transmission of multicast messages via the air interface of a mobile radio system, in particular in UMTS, a multicast message is transmitted in the downlink direction from a network control unit over at least one radio channel to the subscriber devices (User Equipments) of a multicast group, and whereby the transmission power of this at least one transmission is adjusted by means of information which is transmitted in the uplink direction from the subscriber devices to the network control unit over associated radio channels and processed by the network control unit in order to adjust the transmission power, wherein information is transmitted in the downlink direction over at least one associated common radio channel assigned to several of the subscriber devices from the network control unit to the subscriber devices, said information being processed by the receiving subscriber devices for the purpose of power adjustment of the respective associated radio channels in the uplink direction.

According to a further embodiment, a single common associated radio channel may be used per multicast group for the said power adjustment of the respective associated radio channels. According to a further embodiment, the information for the said power adjustment of the respective associated radio channels may be transmitted in the uplink direction in at least one DL burst. According to a further embodiment, the information for power adjustment may comprise TPC (Transmit Power Control) bits, in particular the information concerning a power increase or a power decrease. According to a further embodiment, the number of TPC bits in the at least one burst may be determined by means of a spreading factor. According to a further embodiment, a data part can be present in addition in the at least one burst. According to a further embodiment, it may be determined by means of a spreading factor whether a data part is present in the at least one burst. According to a further embodiment, at least one TFCI (Transport Format Combination Indicator) bit may be present in addition in the at least one burst. According to a further embodiment, at least one MCI (Multicast Indicator) bit may be present in addition in the at least one burst. According to a further embodiment, prior to the power adjustment the subscriber devices may be notified of which TPC bits are intended for which subscriber device. According to a further embodiment, the rules for determining the increase or decrease in the transmission power of the respective associated radio channels in the uplink direction may be specified by the network on the basis of a threshold value for the mobile radio cell in question. According to a further embodiment, the rules may be specified in an initialization routine.

According to another embodiment, a network control unit, in particular base station in UMTS, in particular for implementing such a method, may have means for transmitting a multicast message in the downlink direction over at least one radio channel to the subscriber devices (User Equipments) of a multicast group, whereby the transmission power of this at least one transmission is adjusted by the network control unit by means of information which is transmitted in the uplink direction from the subscriber devices to the network control unit over associated radio channels and processed there for the purpose of power adjustment, and means for generating and transmitting information over at least one associated common radio channel assigned to several of the subscriber devices in the downlink direction from the network control unit to the subscriber devices, whereby the information is processed in the receiving subscriber devices for the purpose of power adjustment of the respective associated radio channels in the uplink direction.

According to yet another embodiment, in a method for use with subscriber devices of a multicast group of a mobile radio system, in particular in UMTS, such a subscriber device transmits information in the uplink direction over a radio channel to a network control unit, whereby the network control unit uses this information for power adjustment of at least one radio channel in the downlink direction over which the network control unit sends a multicast message, wherein the subscriber device receives information from the network control unit in the downlink direction over one associated common radio channel assigned to several subscriber devices of the multicast group, whereby the subscriber device processes this information for the purpose of power adjustment of the said radio channel in the uplink direction.

According to another embodiment, a subscriber device for use in a mobile radio system, in particular for implementing such a method, may have means for receiving a multicast message from a network control unit over at least one radio channel in the downlink direction, as well as means for generating and sending information over a radio channel in the uplink direction to the network control unit for the purpose of power adjustment of the said radio channel, and means for receiving information from the network control unit in the downlink direction over an associated common radio channel assigned to several subscriber devices of the multicast group as well as means for processing this information for the purpose of power adjustment of the said radio channel in the uplink direction.

According to yet another embodiment, a software program can run on a device having a processor, in particular a network control unit as described above or a subscriber device as described above in such a way that the software program together with the device executes the method-related steps on the side of the device as described above.

According to yet another embodiment, a software program can be loaded into a device having a processor, in particular a network control unit as described above or a subscriber device as described above such that the device programmed in this way including the processor has the capability or is adapted to execute the method-related steps as described above.

BRIEF DESCRIPTION OF THE DRAWINGS

Various exemplary embodiments of the invention will be explained in more detail below with reference to the figures, in which.

DETAILED DESCRIPTION

The advantage of the various embodiments consists in particular in that a control of the uplink power adjustment for the subscribers belonging to or registered with a multicast group can be implemented in the downlink direction with only a limited draw on system resources. Thus, instead of one channel per subscriber (as in the prior art) a single targeted dedicated channel can preferably be set up in the downlink for uplink power control per multicast group. TPC bits are preferably used for this purpose.

Through the introduction and use of a so-called physical multicast power channel PMcPCH (the name is freely chosen and includes no restriction) the TPC bits used per subscriber device for uplink power control can be sent in full per multicast group in a single DL burst. Unlike previously, the TPC bits do not need to be sent in a single DL burst in each case to each subscriber device. The advantage therefore lies in the saving of system resources by saving on DL channels and spreading codes for uplink power adjustment.

Figure 1:
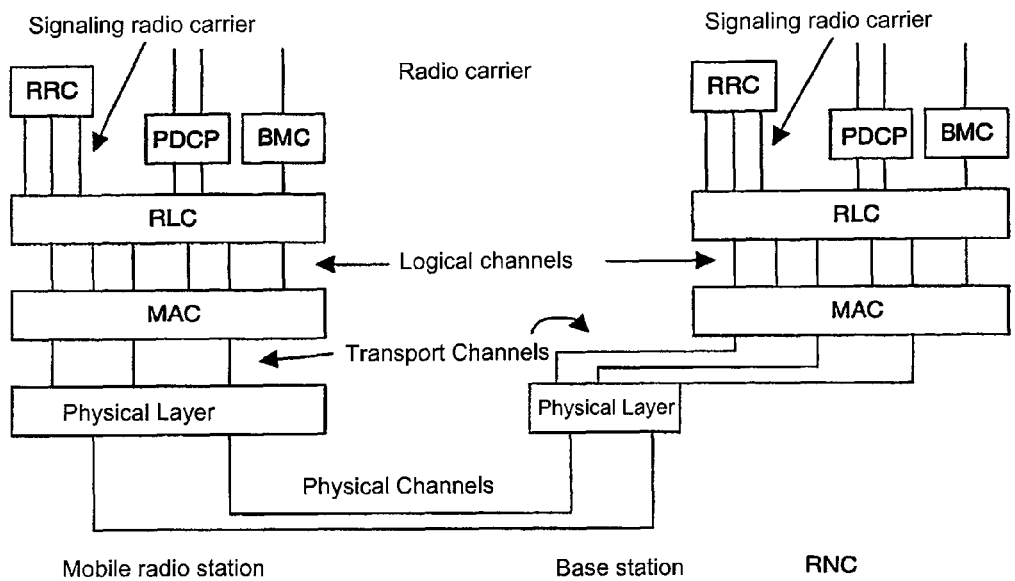
FIG. 1 shows the known layer model of the protocols on the air interface in UMTS.

The layer model of the protocols on the air interface in UMTS according to the prior art is shown in FIG. 1. The mobile radio station consists of a physical layer (Physical Layer 1 or Layer 1) which is responsible on the send side for processing of the data for transmission via the air interface over physical channels and on the receive side passes on the received data to the next-higher media access control layer (Medium Access Control MAC) in such a way that it can be processed further by this layer. The links between the physical layer and the MAC are called transport channels. As well as the MAC layer, the so-called data link layer includes the so-called radio link control (RLC) layer, the packet data convergence protocol (PDCP) and the broadcast/multicast control (BMC). The radio resource control (RRC) is part of the network layer. The links between the MAC layer and the RLC layer are called logical channels. The purpose and operation of these layers are detailed in the respective known specifications and are not of any greater relevance in the context of the present description.

The structure of the network side is in principle similar to that of the base station. The physical layer is contained in the base station, which is connected via a fixed network connection to the radio network control unit (Radio Network Controller RNC). The transport channels between the physical layer and the MAC layer specify how the data is transmitted, for example on common channels or on dedicated channels, which are assigned solely to one specific mobile radio station. The MAC layer identifies e.g. the users for whom a packet is intended if this packet is transmitted on common channels. In addition the MAC layer handles the mapping of the logical channels onto the transport channels. For this purpose, on the send side the MAC layer adds control information, e.g. the identity of the mobile radio station, to the packets that it has received from the next-higher RLC layer. This control information is evaluated on the receive side and removed again from the packets before these are forwarded via the logical channels to the RLC layer.

Figure 2:
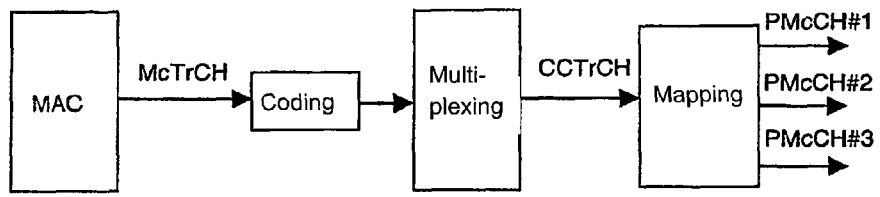
FIG. 2 shows signal processing in a network control unit for transmission of a multicast message.

FIG. 2 shows signal processing in a base station for preparation of the sending of a multicast message on the air interface in UMTS. According to the UMTS specifications, e.g. TS 25.212 V4.0.0: Multiplexing and channel coding, 3GPP-TSG-RAN, 2001-3, in the downlink the multicast transport channel McTrCH for the corresponding multicast group is multiplexed or mapped after a first signal processing, in particular after coding, onto a so-called coded composite transport channel CCTrCH. According to the exemplary embodiment shown in FIG. 2, this is followed by a mapping onto one or more physical multicast channels, which are referred to here as DL-PMcCH#n. The number n of these channels is symbolized by the appending of #n. According to the example in FIG. 2 these are three DL-PMcCH#n in the present case. This PMcCH is similar in its structure and in the power control to the downlink shared channel DSCH, which represents a common channel which is assigned to only one specific subscriber device at a specific time. During this time only this one subscriber device also receives this channel PMcCH for the transmission of user data.

Figure 3:
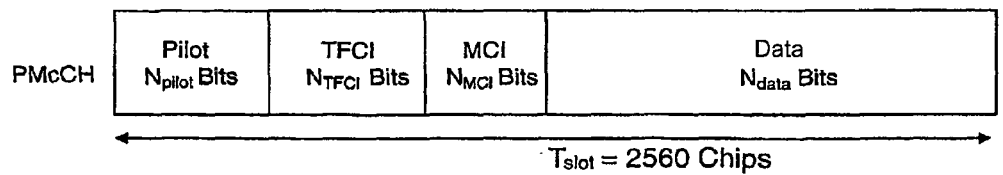
FIG. 3 shows the structure of a possible burst for transmission of a multicast message in the downlink.

A possible structure of such a physical channel DL-PMcCH is shown in FIG. 3. A pilot part containing the number N bits ("$N_{pilot}$"), which are used by the receiver for channel estimation, is followed by N TFCI (Transport Format Combination Indicator) bits, which specify an index for possible combinations of transport formats of different transport channels which permit multiplexing onto a CCTrCH. A combination of this kind is called a transport format combination. The burst shown in FIG. 3 adds on N MCI (Multicast Indicator) bits, which are used to identify the multicast services. Finally, the N data bits follow in the burst.

After the mapping onto one or more physical channels— for example onto the channels shown in FIG. 3 or also onto other dedicated or common physical channels—has been completed, it can be followed by further signal processing measures which are aimed at ensuring the reliable transmission of the information to the destination, e.g. further interleaving or bit interleavings.

Figure 4:
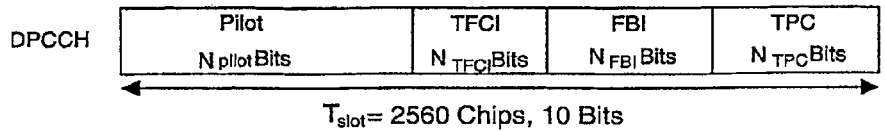
FIG. 4 shows the known structure of a burst on the DPCCH channel for power adjustment in the uplink.

Accordingly the multicast information for a multicast group is transmitted to the subscriber devices which have registered with this multicast group by means of one or more physical channels, whereby the volume of data determines the number of physical channels. Each receiving subscriber device of this multicast group is assigned an associated dedicated uplink channel DPCCH in order to ensure power control for these multicast subscriber devices in a so-called closed loop. FIG. 4 shows a burst of such a known UL channel DPCCH, whereby this burst is composed of N pilot bits, N TFCI bits, N FBI (Feedback Information) bits, which are needed for functions which require a feedback message from the subscriber device UE to the UTRAN on layer 1 level, as well as the N TPC bits. Thus, if the subscriber devices discover that they are receiving the multicast information with too much or too little transmission power, then the request for a reduction in power or an increase in power is signaled by means of TPC bits to the base station or the NodeB.

To ensure that these associated UL channels do not have too great an effect on the interference situation in the mobile radio cell, these channels too are power-controlled. The control of these associated UL channels is likewise accomplished by means of TPC bits on associated DL channels. In this process the power is adjusted either up or down. According to various embodiments these DL channels for transmitting the control information for adjusting the power of the UL channels are not individual dedicated channels whose number would correspond to the number of multicast subscriber devices of the respective multicast group which are to be served, but preferably a single common channel for all this TPC information in the DL per multicast group.

Figure 5:
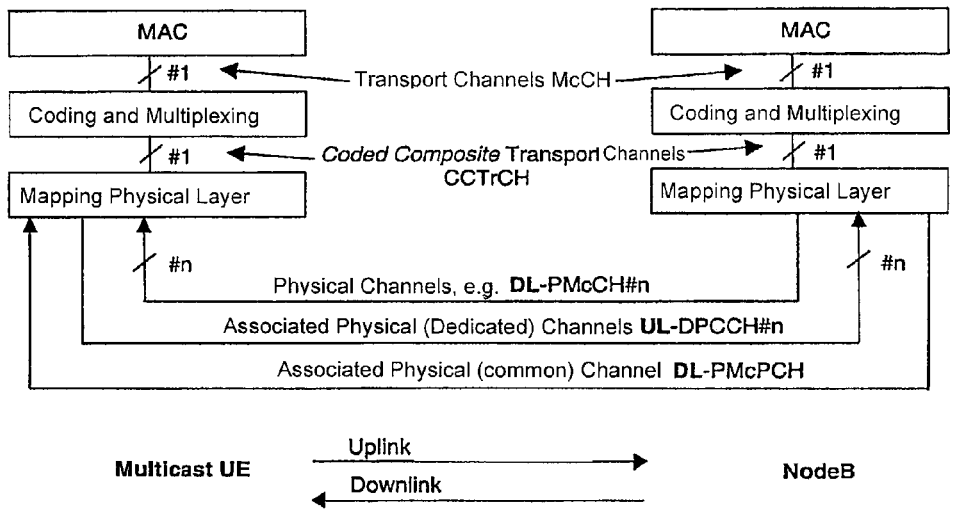
FIG. 5 shows a layer model of the protocols on the air interface in UMTS with a power adjustment according to various embodiments of the DPCCH channel in the downlink.

This situation is represented schematically in FIG. 5, in which for the sake of clarity the RLC, RRC, PDCP and BMC layers have been left out compared with FIG. 1, but in which for illustration purposes the coded composite transport channels CCTrCH (see also FIG. 2) are inserted. Starting from NodeB a multicast message is sent once via the MAC layer, a transport channel McCH and a CCTrCH to the mapping physical layer. The fact that in this case there is a single McCH and a single CCTrCh is symbolized by the designation #1. The mapping physical layer transmits the multicast message in the downlink via one or more physical channels (number n or #n) to the subscriber device "multicast UE". This transmission, which according to the exemplary embodiment shown in FIG. 5 takes place over n physical channels DL-PMcCH (see FIGS. 2 and 3), is power-controlled or adjusted in the uplink by means of n associated physical channels UL-DPCCH (see FIG. 4) as in the prior art. According to the various embodiments these n channels DL-DPCCH are now power-adjusted via a common associated physical channel DL-PMcPCH with the aid of TPC bits. In this process the network control unit, i.e. the NodeB in question in the corresponding mobile radio cell, detects that the TPC bits which are transmitted over the channel UL-DPCCH are being sent at an unnecessarily high power or too weak a power and from this, using suitable processor means, generates the information "increase power" or "reduce power" to be stored in the TPC bits, which are then sent preferably in a single DL burst—or also if necessary in multiple DL bursts—of the channel DL-PMcPCH according to the various embodiments.

The arrangement of the TPC bits can be implemented in different ways. Two examples of the structure of this channel for transmitting the power adjustment information in bursts, called PMcPCH (Physical Multicast Power Channel) in the following, are shown in FIGS. 6 and 7.

Figure 6:
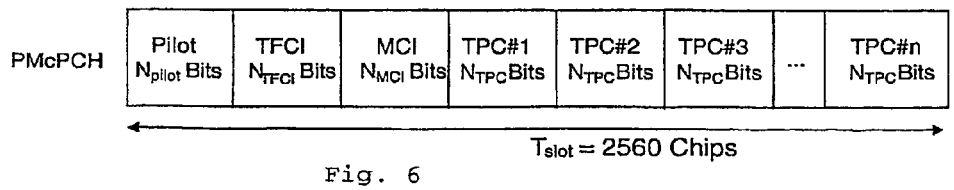
FIG. 6 shows a first exemplary embodiment of a burst on the PMcPCH channel in the downlink.
Figure 7:
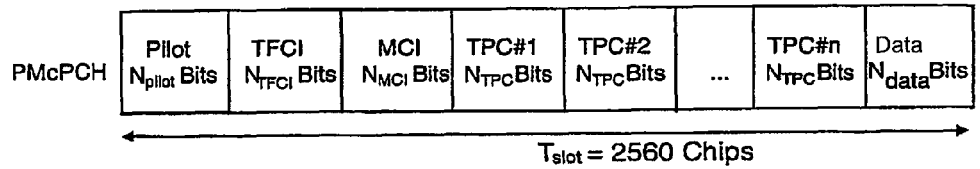
FIG. 7 shows a second exemplary embodiment of a burst on the PMcPCH channel in the downlink.

FIG. 6 shows a first embodiment of a burst structure of the physical multicast power channel PMcPCH for the transmission of multiple TPC bits in a downlink burst (TPC bits). With this variant, the DL burst contains pilot bits which are used for channel estimation by the receiver, TFCI bits for indexing possible transport combinations, MCI bits for identifying the multicast services, and a number of TPC bits. FIG. 7 shows a second embodiment of the burst structure of the PMcPCH for transmitting multiple TPC bits in a downlink burst. The difference or extension compared to the first variant according to FIG. 6 consists in an additional data part existing in the PMcPCH burst. This data part can optionally be used for transmitting multicast information or multicast data to the subscriber devices of the corresponding multicast group. In all other respects the same statements apply as for FIG. 6.

The TFCI bit(s) and/or the MCI bit(s) are (like the data bits also) optional.

The number of TPC bits—and preferably also the number of TFCI and/or MCI bits—and also whether a data part is present or not, can be set or determined according to the various embodiments by the choice of the spreading factor. A low spreading factor, e.g. 4, means that 16 bits can be used for the pilot part, 2 bits for the TFCI field, 2 bits for the MCI part and a total of 20 bits for TPC parts, which means that these 20 DL-TPC bits are the UL control of the TPC bits of 10 UEs.

Figure 8:
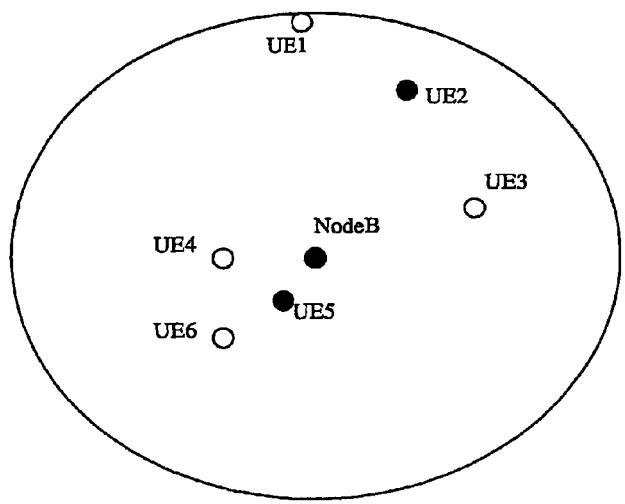
FIG. 8 shows a mobile radio cell with a plurality of mobile radio stations.

An embodiment of a power control execution sequence is shown in FIG. 8. In this example there are 6 mobile radio stations (User Equipments) in a mobile radio cell. The mobile radio stations UE1, UE3, UE4 and UE6 are registered or associated with a multicast group X (white circles), while UE2 and UE5 are registered or associated with a different group Y (black circles). Only the mobile radio stations belonging to group X are relevant for the following explanations. In the download, owing to e.g. a large volume of data, the multicast information for group X is mapped by means of a transport channel CCTrCH onto 3 different physical (dedicated) channels PMcCH1-PMcCH3 (see also FIGS. 2 and 3), all of which can and are to be received by the 4 mobile radio stations UE1, UE3, UE4 and UE6. The PMcCH channels preferably contain the TFCI and MCI information and the multicast data. Each of these UEs is assigned an associated UL control channel, UL-DPCCH1-DPCCH4, or is determined by the transport format combination indicator TFCI, see also FIG. 4. In order to ensure a positive interference situation in the mobile radio cell on account of the different position of the subscribers UE1, UE3, UE4 and UE6 in the multicast group, the UL-TPC bits are preferably power-controlled.

This control is achieved according to the various embodiments by means of a single common DL-PMcPCH (common channel). The TFCI and MCI fields are preferably specified either in the n PMcCH or the PMcPCH and apply frame by frame (where a frame consists of 15 bursts/slots).

It is known to the multicast subscriber devices, suitably by means of prior signaling of a multicast data transmission, which TPC bits are intended for which subscriber device. A prior signaling of this kind takes place as required; for a multicast group with defined subscriber devices only a one-time prior signaling is necessary.

Figure 9:
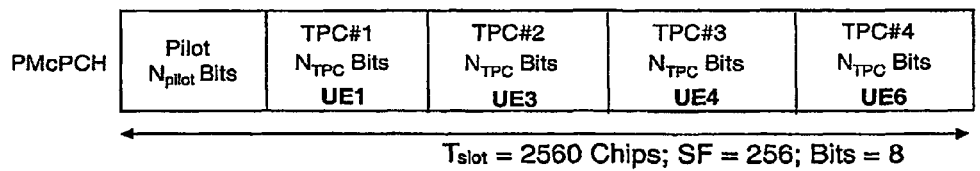
FIG. 9 shows an example of a structure of a DL burst according to FIGS. 6 and 8.

FIG. 9 shows an example of an assignment of this type specified by prior signaling which makes reference to the example shown in FIG. 8. In this instance the abbreviation "SF" denotes the spreading factor. In the present example UE1, for example, might not be able to receive the multicast information in an orderly manner due to an assumed missing line-of-sight connection to NodeB, with the result that an increase in the transmission power of the TPC bits in the UL is necessary for UE1. In this case the TPC#1 bits in the DL, i.e. the first bits following the $N_{pilot}$ bits, contain the command "Power_Up". On the other hand, for UE4 and UE6 for example, a reduction in the transmission power of their TPC bits in the UL could be appropriate by means of the TPC bits in the DL on the PMcPCH because these mobile radio stations are located for example very close to NodeB and have a direct line-of-sight connection; see FIG. 8. The respective command would then be "Power_Down" in TPC#3 and TPC#4 in the DL burst. For UE3, the command "Power_Up" could in turn be present in the TPC bit#2 of the DL because, for example, there is no direct line-of-sight connection to NodeB, but presumably the connection is concealed e.g. by a building. As a result it is difficult for the TPC bits in the UL to be received by NodeB. The rules for determining the increase or reduction in the transmission power of the TPC bits in the UL are preferably specified for this mobile radio cell by the network in e.g. the initialization routine on the basis of a threshold value. The invention relates to the corresponding methods and devices both on the network side and on the subscriber device side. The term "subscriber device" covers in particular not only mobile radio telephones but also systems in which, for example, a notebook or laptop connected to a mobile radio telephone handles functions according to the invention. Furthermore the software programs necessary for implementing the methods are part of the present invention.

ABBREVIATIONS USED

CDMA Code Division Multiple Access
DCH Dedicated Channel
DL DownLink: transmission direction from NodeB to the UEs
DSCH Downlink Shared Channel
FDD Frequency Division Duplex
MAC Medium Access Control
McCH Multicast Channel MCI Multicast Indicator
NodeB Base station in UMTS
PMcCH Physical Multicast Channel
RLC Radio Link Control
RNC Radio Network Controller
TDD Time Division Duplex
TFCI Transport Format Combination Indicator
TPC Transmit Power Control
UE User Equipment<->mobile radio terminal
UL UpLink: transmission direction from the UEs to NodeB
UMTS Universal Mobile Telecommunications System

The invention claimed is:

1. A method for use with network control units for power adjustment during transmission of multicast messages via the air interface of a mobile radio system, comprising the steps of:
transmitting a multicast message in the downlink direction from a network control unit over a plurality of downlink radio channels to a plurality of subscriber devices of a multicast group,
adjusting the transmission power of the downlink transmissions over the plurality of radio channels by means of information which is transmitted in the uplink direction from the plurality of subscriber devices to the network control unit over a plurality of associated uplink radio channels and processed by the network control unit in order to adjust the transmission power, and
transmitting information in the downlink direction over a common downlink radio channel assigned to the plurality of the subscriber devices from the network control unit to the plurality of subscriber devices, said information being processed by the plurality of receiving subscriber devices for power adjustment of the plurality of associated uplink radio channels,
wherein the common downlink radio channel is distinct from the plurality of downlink radio channels.

2. The method according to claim 1, wherein
a single common associated radio channel is used per multicast group for the said power adjustment of the respective associated radio channels.

3. The method according to claim 1, wherein
the information for the said power adjustment of the respective associated radio channels is transmitted in the uplink direction in at least one burst.

4. The method according to claim 3, wherein
a data part is present in addition in the at least one burst.

5. The method according to claim 3, wherein
it is determined by means of a spreading factor whether a data part is present in the at least one burst.

6. The method according to claim 3, wherein
at least one TFCI (Transport Format Combination Indicator) bit is present in addition in the at least one burst.

7. The method according to claim 3, wherein
at least one MCI bit is present in addition in the at least one burst.

8. The method according to claim 1 or 2, wherein
the information for power adjustment comprises TPC bits, in particular the information concerning a power increase or a power decrease.

9. The method according to claim 8, wherein
the information for the said power adjustment of the respective associated radio channels is transmitted in the uplink direction in at least one burst, and
the number of TPC bits in the at least one burst is determined by means of a spreading factor.

10. The method according to claim 1, wherein
prior to the power adjustment the subscriber devices are notified of which TPC bits are intended for which subscriber device.

11. The method according to claim 1, wherein
rules for determining the increase or decrease in the transmission power of the respective associated radio channels in the uplink direction are specified by a network on the basis of a threshold value for a respective mobile radio cell.

12. The method according to claim 11, wherein
the rules are specified in an initialization routine.

13. The method according to claim 1, wherein the mobile radio system operates according to UMTS.

14. A network control unit, comprising:
means for transmitting a multicast message in the downlink direction over a plurality of downlink radio channels to a plurality of subscriber devices of a multicast group, wherein the transmission power of this transmission over the plurality of downlink radio channels—is adjusted by the network control unit by means of information which is transmitted in the uplink direction from the plurality of subscriber devices to the network control unit over a plurality of associated uplink radio channels and processed there for the purpose of power adjustment, and
means for generating and transmitting information over an associated common downlink radio channel assigned to the plurality of the subscriber devices in the downlink direction from the network control unit to the plurality of subscriber devices, whereby the information is processed in the plurality of receiving subscriber devices for power adjustment of the plurality of associated uplink radio channels,
wherein the common downlink radio channel is distinct from the plurality of downlink radio channels.

15. The network control unit according to claim 14, wherein the network control unit is a UMTS base station.

16. A method for use with subscriber devices of a multicast group of a mobile radio system, comprising the steps:
transmitting information by a plurality of subscriber devices in the uplink direction over a plurality of uplink radio channels to a network control unit, wherein the network control unit uses this information for power adjustment of a plurality of downlink radio channels in the downlink direction over which the network control unit sends a multicast message, and
receiving information by the plurality of subscriber devices from the network control unit in the downlink direction over one associated common downlink radio channel assigned to the plurality of subscriber devices of the multicast group, wherein the plurality of subscriber devices process this information for the purpose of power adjustment of the plurality of uplink radio channels,
wherein the common downlink radio channel is distinct from the plurality of downlink radio channels.

17. A subscriber device for use in a mobile radio system, comprising:
means for receiving a multicast message from a network control unit over a plurality of downlink radio channels in the downlink direction, as well as means for generating and sending information over a plurality of uplink radio channels in the uplink direction to the network control unit for the purpose of power adjustment of the said plurality of downlink radio channels, and means for receiving information from the network control unit in the downlink direction over an associated common downlink radio channel assigned to the plurality of subscriber devices of the multi-cast group as well as means for processing this information for power adjustment of the plurality of uplink radio channels, wherein the common downlink radio channel is distinct from the plurality of downlink radio channels.

18. A software program product comprising a non-transitory computer readable medium storing program code which when executed on a device having a processor operates in such a way that the software program together with the device executes the following steps by the device:

transmitting a multicast message in the downlink direction from a network control unit over a plurality of downlink radio channels to a plurality of subscriber devices of a multicast group, adjusting the transmission power of the downlink transmissions over the plurality of downlink radio channels by means of information which is transmitted in the uplink direction from the subscriber devices to the network control unit over a plurality of associated uplink radio channels and processed by the network control unit in order to adjust the transmission power, and transmitting information in the downlink direction over a common downlink radio channel assigned to the plurality of the subscriber devices from the network control unit to the plurality of subscriber devices, said information being processed by the plurality of receiving subscriber devices for the purpose of power adjustment of the plurality of associated uplink radio channels, wherein the common downlink radio channel is distinct from the plurality of downlink radio channels.

19. A software program product comprising a non-transitory computer readable medium storing program code which when loaded into a device having a processor and executed in the processor programs the device including the processor such that the device is operable to execute the steps of:

transmitting a multicast message in the downlink direction from a network control unit over a plurality of downlink radio channels to a plurality of subscriber devices of a multicast group, adjusting the transmission power of the downlink transmissions over the plurality of downlink radio channels by means of information which is transmitted in the uplink direction from the plurality of subscriber devices to the network control unit over a plurality of associated uplink radio channels and processed by the network control unit in order to adjust the transmission power, and transmitting information in the downlink direction over a common downlink radio channel assigned to the plurality of the subscriber devices from the network control unit to the plurality of subscriber devices, said information being processed by the plurality of receiving subscriber devices for the purpose of power adjustment of the plurality of associated uplink radio channels, wherein the common downlink radio channel is distinct from the plurality of downlink radio channels.

\* \* \* \* \*